2,862,910
LIQUID PHENOLIC RESINS

Louis M. Higashi and Reino A. Jarvi, San Jose, Calif., assignors to Monsanto Chemical Company, St. Louis, Mo., a corporation of Delaware No Drawing. Application November 9, 1955
Serial No. 545,998

3 Claims. (Cl. 260—60)

This invention relates to liquid phenolic resins. More particularly the invention relates to a process and method for preparing liquid phenolic resins.

Liquid phenolic resin is a term applied in the art to condensation products of a phenol with an aldehyde which have not been isolated from the aqueous reaction medium in which they are formed and which may or may not have been diluted with an organic solvent. The major difficulties attendant upon the production of these resins have been the development of dark color during the reaction, difficulty of removal of catalyst after the reaction is completed, and poor dilutability of the liquid resin with water.

One of the objects of this invention is to provide improved liquid phenolic resins.

A further object is to provide light-colored, stable and water-dilutable liquid phenolic resins.

Another object is to provide a process for the preparation of improved liquid phenolic resins.

These and other objects are attained by reacting a phenol with formaldehyde in the presence of a lithium compound under carefully controlled conditions, cooling the reaction medium rapidly, neutralizing the cooled medium with orthophosphoric acid to a pH of 7.0–7.2 and then filtering the neutralized medium.

The following examples are illustrative of the process and products of this invention.

Example I

Mix together 1 mol of phenol, about 2.1 mols of formaldehyde in the form of 91% flake paraformaldehyde, about 0.8 mol of water and about 0.04 mol of lithium hydroxide monohydrate. Heat the mixture with agitation under refluxing conditions at 80° C. and reduced pressure of about 20 inches of mercury until the free formaldehyde content is below 4.5%. Immediately cool the reaction medium to about 25° C. The cooled reaction medium has a pH of about 8.2. Adjust the percent solids of the medium to about 60% by weight by the addition of about 1.5 mols of water. Now add sufficient orthophosphoric acid to neutralize the reaction medium to a pH of 7.0–7.2 (about 0.01–0.015 mol of orthophosphoric acid). The lithium phosphate formed in the neutralization step will crystallize in the reaction medium in from 20 to 30 minutes at 25° C. Filter the reaction medium to remove the crystals. The product is a 60% solids liquid phenolic resin having a pH of 7.0–7.2, an ash content of less than 0.25% by weight, water dilutability of about 20:1 and a dry rubber at 150° C. of about 160 seconds.

If the amount of lithium hydroxide monohydrate shown in the example is reduced to 0.032 mol with a corresponding reduction in the amount of orthophosphoric acid, the liquid resin product is identical with that of Example I except that the water dilutability is only 15:1.

Example II

Mix together 1 mol of phenol, 0.3 mol of water, 0.008 mol of tertiary butyl phenol, about 1.1 mols of formaldehyde in the form of 91% paraformaldehyde flake and about 0.005 mol of lithium hydroxide monohydrate. Heat the mixture with agitation at about 90° C. under vacuum until the free formaldehyde content is less than 0.8% and then cool the reaction immediately to 30° C. or below. The product is a viscous liquid having a pH of 7.4–7.7. Dilute the cooled product with sufficient denatured ethyl alcohol to adjust the solids of the reaction product to about 65% by weight. Now add sufficient orthophosphoric acid to reduce the pH to 7.0–7.2 (about 0.002 mol). Within a short time at temperatures of 30° C. or less, a semi-gelatinous precipitate is formed which can be easily removed by filtration using diatomaceous earth filter aid. The product is a viscous liquid phenolic resin having a pH of about 7.0 and a solids content of about 65% by weight. The product contains about 0.2% ash by weight and has a dry rubber at 150° C. of about 256 seconds. The water dilutability of the product is about 1.5:1.

The resins of this invention are prepared from monohydric phenols such as phenol, the cresols, the xylenols, tertiary-butyl phenol, phenethyl phenol etc. Mixtures of two or more of the monohydric phenols may be used. When a phenol containing a side-chain longer than two carbon atoms is used, it is preferable that it be used as a minor component in conjunction with phenol or cresol.

The phenol is condensed with from 0.8 to 3 mols of formaldehyde under alkaline conditions, i. e. a pH of 7.2 to 8.5. The formaldehyde is preferably in the form of paraformaldehyde to avoid the removal of excess water at the end of the condensation step. If aqueous formaldehyde such as formalin is used, the condensation product should be concentrated by heating under vacuum at relatively low temperatures until the solids content of the reaction medium is at least 50% by weight. When paraformaldehyde is used, a small amount of water is used to promote the reaction. Generally this amount may range between 0.2 and 1 mol of water per mol of phenol.

The catalyst for the reaction is lithium hydroxide. It may be introduced into the reaction as the compound itself or as a lithium compound which is transformed into lithium hydroxide in the reaction medium. Thus the lithium hydroxide may be initially introduced as lithium oxide, lithium hydroxide monohydrate or lithium carbonate. The amount of catalyst to be used should be sufficient to create a pH of from 7.2 to 8.5 in the reaction medium. Generally amounts ranging from 0.002 to 0.10 mol of the lithium compound is sufficient.

The condensation reaction should be carried out at temperatures from 30 to 90° C. under refluxing conditions at reduced pressure. The reaction is continued until the free formaldehyde content of the reaction medium is reduced to less than 5% by weight.

As soon as the desired formaldehyde concentration is achieved, the reaction medium should be cooled quickly to at least 30° C. and preferably to about 25° C. At this point, the reaction medium may be diluted with water or an organic solvent to attain the proper solids concentration, although such dilution may be deferred until after the filtration step. The reaction medium having been cooled and diluted if desired, sufficient orthophosphoric acid is added to reduce the pH of the medium to 7.0–7.2. Within this range and only within this range, an insoluble partial neutralization product of the lithium hydroxide is formed. The insoluble material will be crystalline if sufficient water is present and the temperature is below 30° C. If there is a deficiency of water the precipitate will be partially gelatinous. The deficiency of water occurs only in a material like that of Example II in which the solids content is about 65% by weight and a portion of the solvent medium is organic in character. In other cases where the solids content ranges from 50–70% by weight and the solvent is water alone the precipitate is crystalline. The neutralizing material should be orthophosphoric acid. The only operable substitutes are the other phosphoric acids which become orthophosphoric acid in the presence of sufficient amounts of water. However, the amount of water usually present in the liquid resins of this invention is so small and the amount of acid needed is so small that the use of the other phosphoric acids is difficult to control.

The insoluble precipitate is fully formed and begins to settle from the liquid phenolic resin within a few minutes after the addition of the phosphoric acid. After about twenty minutes it has settled sufficiently so that simple decantation will produce a substantially ash free liquid resin. However, it is more feasible to filter the liquid resin since the precipitate is crystalline and does not clog the filter thus rendering the filtration step quite rapid.

The organic solvents which may be used to dilute the initial reaction product should be solvents for the resin and miscible with water. Aliphatic alcohols such as ethanol, propanol, isopropanol and butanol are the best of such solvents. In some cases a minor proportion of the solvent may be replaced with an aromatic hydrocarbon such as benzene or xylene but there must be sufficient alcohol to produce miscibility with the water.

The liquid phenolic resins of this invention are nearly water-white in color, contain almost no inorganic material, are readily dilutable with water in ratios up to 20 parts of water by weight to 1 part of liquid resin and do not discolor to any great extent on heating or exposure to light. They are particularly useful as a binder for glass fibers and mineral wools to produce articles having a pleasing appearance. For example, glass fiber fishing rods made using the resins of this invention as a binder have a color substantially equivalent to that of the lightest bamboo fishing rods.

For some purposes it is desirable to add conventional modifiers such as pigments, dyes, fillers, lubricants etc. No difficulty is found in making these additions by conventional methods.

The foregoing is given in illustration and it is obvious that many variations may be made within the spirit and scope of this invention.

What is claimed is:

1. A process for preparing a liquid phenolic resin which comprises (1) condensing 1 mol of a monohydric phenol with from 0.8 to 3 mols of formaldehyde in the presence of 0.002 to 0.10 mol of a catalyst taken from the group consisting of lithium oxide, lithium hydroxide, lithium hydroxide monohydrate and lithium carbonate and in the presence of sufficient water to yield a 50–70% solids end-product, said condensation being carried out under reflux at temperatures of 30–90° C. at reduced pressure, until the free formaldehyde content is less than 5% by weight, (2) thereafter cooling the reaction medium rapidly to less than 30° C., (3) neutralizing the cooled reaction medium with orthophosphoric acid to a pH of 7.0–7.2, whereby a crystalline precipitate is formed, and (4) filtering the reaction medium.

2. A process as in claim 1 wherein the phenol is a mixture of phenol and tertiary-butyl phenol the latter being present in minor amount based on the phenol.

3. A process as in claim 1 wherein the reaction medium is diluted with an organic solvent for the condensation product prior to the neutralization step.

References Cited in the file of this patent

UNITED STATES PATENTS 2,190,672   Meharg _____ Feb. 20, 1940

OTHER REFERENCES

Carswell: "Phenoplasts," pages 13 and 14, Interscience (1947).

"Handbook of Chemistry and Physics," 33rd edition, Chemical Rubber Publishing Co., Cleveland, Ohio, 1951, pages 516 and 574.